L. MARKS.
Carbureter.
No. 168,910.
Patented Oct. 19, 1875.
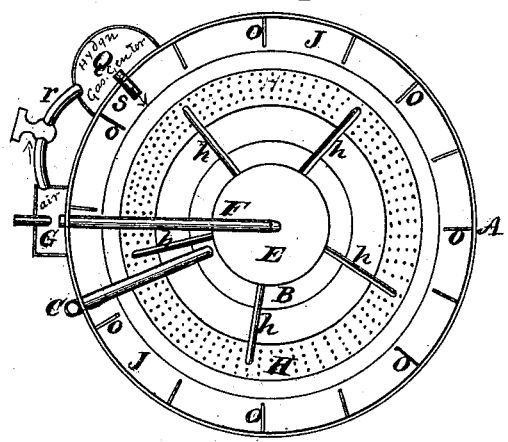
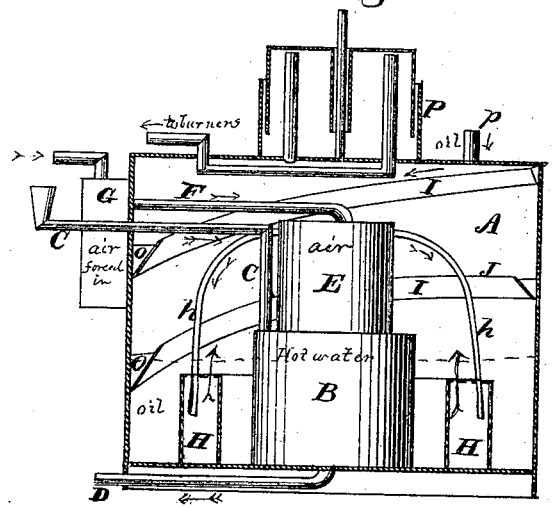
Witnesses
Geo. H. Strong
Jno. L. Boone
Inventor
Louis Marks
by Dewey & Co
Attys

UNITED STATES PATENT OFFICE.

LOUIS MARKS, OF SAN FRANCISCO, CALIFORNIA.

IMPROVEMENT IN CARBURETERS.

Specification forming part of Letters Patent No. 168,910, dated October 19, 1875; application filed March 11, 1875.

*To all whom it may concern:*

Be it known that I, LOUIS MARKS, of San Francisco city and county, State of California, have invented an Improved Carbureter; and I do hereby declare the following description and accompanying drawings are sufficient to enable any person skilled in the art or science to which it most nearly appertains to make and use my said invention or improvement without further invention or experiment.

My invention relates to an improved apparatus for carbureting atmospheric air, in order to render it inflammable and suitable for illuminating purposes; and it consists in the combination of devices hereinafter explained.

In order to describe my invention so that others will be able to understand its construction and operation, reference is had to the accompanying drawings, forming a part of this specification, in which—

Figure 1 is a horizontal section of my carbureter. Fig. 2 is a vertical section.

A is the carbureting-vessel, inside of which the air to be carbureted is brought in contact with the hydrocarbon. Inside of this vessel, and upon the center of its bottom, I construct a tight tank, B, from the top of which a pipe, C, leads to the outside of the vessel A, and from the bottom of which a pipe, D, also leads to the outside of the vessel. This vessel I fill with hot water through the pipe C, so as to keep the oil in the vessel at the proper volatilizing-temperature. This tank should be as high as the oil-level; but its height and size will generally depend upon the size and capacity of the vessel A. The pipe D is used for the purpose of withdrawing the water from the tank B when it becomes cold. Upon the tank B I construct the air-reservoir E, and connect it, by means of a pipe, F, with another air-reservoir, G, on the outside of the vessel, as shown. Surrounding the hot-water tank B, and at a short distance from it, I make a circular hollow wall, H, which extends upward from the bottom of the tank about as high as the level of the oil. This wall is constructed of sheet metal, and is perforated with numerous small holes. I then connect the air-reservoir E with the interior of this foraminous wall by means of pipes $h$ $h$ $h$, so that the air in the reservoir can be forced into the hollow wall. Against the inside of the wall of the vessel A I construct a descending spiral channel, J, which is formed by soldering a flange, I, to the wall at an angle, so as to provide a channel with a V-shaped cross-section. This channel commences at the top of the vessel A, and winds spirally around it, descending to near its bottom; and at intervals along the length of this spiral channel I provide partitions $o$ $o$, which do not extend quite to the top of the flange I.

The hydrocarbon oil is fed into the upper end of the spiral channel J through a tube, $p$, which passes down through the cover of the vessel A; thence it flows down the incline, filling the spaces between the partitions $o$ $o$ until the oil stands at a level with each partition in each compartment along the descent. After that the oil will flow down the channel, passing over each partition until it arrives at the bottom of the vessel.

The vessel A is kept continually supplied with a sufficient quantity of oil to cover the top of the foraminous wall H, and this can be done by means of a valve operated by a float, as described in a recent patent issued to me for an improved carbureter, or by other means. Air is then forced, through the reservoir G and pipe F, into the reservoir E; thence it passes through the pipes $h$ $h$ $h$ into the foraminous hollow wall, from which it issues through the oil into the vessel above the oil, becoming saturated during its passage.

Upon the cover of the vessel is a gas-holder, P, into which the carbureted air passes, and from which it passes to the burners. On the outside of the vessel A I construct another reservoir, Q, and connect it with the outside air-reservoir G by a pipe, $r$; and in this reservoir I place a quantity of dilute muriatic acid, in the proportion of about one quart of water and two ounces muriatic acid. In this dilute acid I place a piece of zinc, so as to liberate hydrogen gas. The hydrocarbon gas in the burner being too richly charged with carbon causes the flame to give off smoke. Hence the additional hydrogen gas, which corrects the difficulty, and secures an illuminating-gas which may be burned in any common gas-burner without a chimney. A nozzle, $s$, extends from the upper part of this reservoir through the side of the vessel A to its inside, and terminates over the inclined channel I. A cock, t, on the length of the pipe r serves to close or open communication between the reservoirs G Q, when desired. By opening this cock a portion of air is diverted from the reservoir G and passed into the reservoir Q, and through the dilute muriatic acid contained therein, carrying with it, through the nozzle s into the vessel A, an additional supply of hydrogen gas.

Having thus described my improvements, what I claim, and desire to secure by Letters Patent, is—

1. The air-reservoir E, connected, by means of pipes h h h, with the hollow foraminous concentric wall H, substantially as and for the purpose described.

2. In a carbureting-vessel, the descending spiral channel J, with its partitions o o, substantially as and for the purpose described.

In witness whereof I hereunto set my hand and seal.

LOUIS MARKS. [L. S.]

Witnesses:
JNO. L. BOONE,
C. M. RICHARDSON.